Dec. 19, 1939.  C. W. DUNLAP  2,183,712
WALL ANCHOR
Filed Nov. 7, 1938
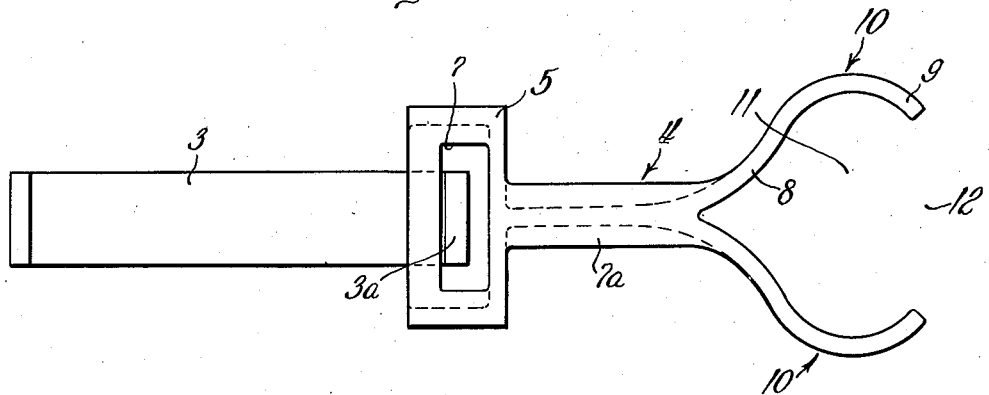
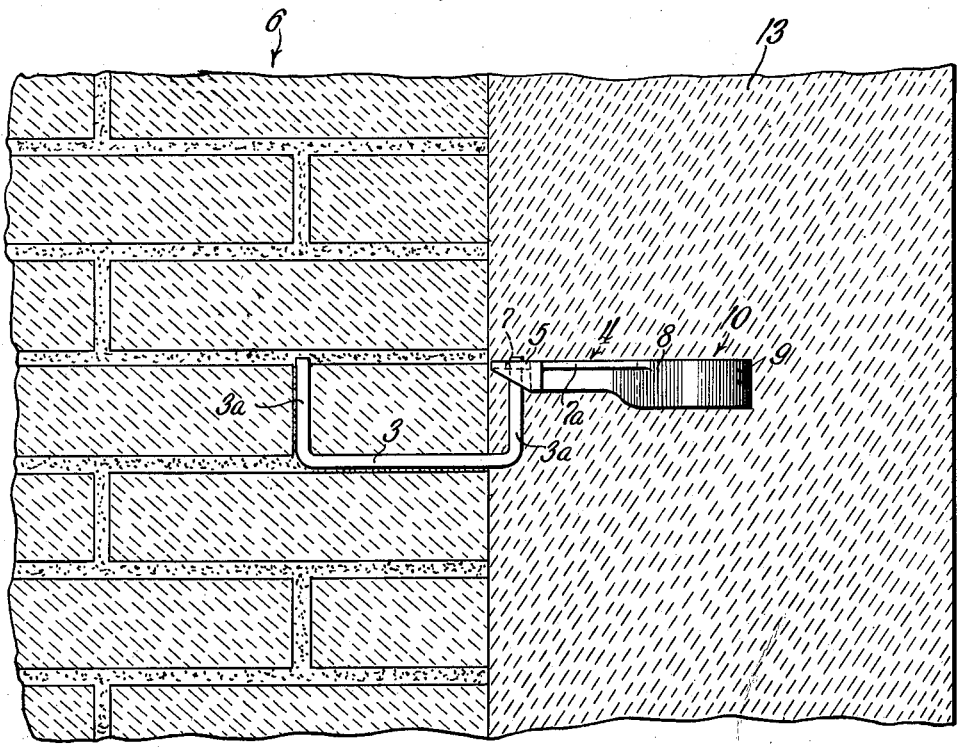
Inventor
Charles W. Dunlap

Patented Dec. 19, 1939

2,183,712

UNITED STATES PATENT OFFICE 2,183,712

WALL ANCHOR

Charles W. Dunlap, Chicago, Ill., assignor to Plibrico Jointless Firebrick Company, Chicago, Ill., a corporation of Illinois Application November 7, 1938, Serial No. 239,306

2 Claims. (Cl. 72—101)

This invention relates to anchoring means, and has to do with means for anchoring a lining to a retaining wall.

In Patent No. 1,828,618, issued October 20, 1931, to Ivon S. Pieters, for Anchor for furnace linings, there is disclosed anchor means of the same general type with which my invention is concerned. In the means of the patent referred to, there is provided an anchor member which is embedded within a lining at the inner face of a retaining wall, this anchor member being provided, at its inner end, with a rectangularly disposed flange of considerable width. The lining is formed of material originally plastic, this material in its plastic condition being built inward from the inner face of the retaining wall, by bonding together pieces or lumps of the plastic material so as to produce a monolithic lining. In practice, the anchor members, of which there are a considerable number, are spaced short distances apart, and, as the lining is built up, the plastic material thereof fills the anchors so as to be retained thereby. The lining is constructed from the inner face of the retaining wall inward, as above noted, and may be considered as comprising two portions, an inner portion located inward of the flanges at the inner ends of the anchors and an outer portion extending outward from such flanges. Due to the flanges at the inner ends of the anchors, the outer portion of the lining is restrained against movement during the pounding together of the lumps of plastic material, to form the inner portion of the lining. This pounding causes a certain amount of movement of the inner portion of the lining relative to the outer portion thereof, resulting in the creation of a plane of cleavage between the inner and the outer portions of the lining, such plane being substantially coincident with the inner faces of the flanges at the inner end of the anchors. The effect is much like that produced when two moist pieces of clay are rubbed together, such rubbing causing the opposed surfaces of the clay pieces to become slick, forming a plane of cleavage between them, though the effect is not so pronounced, ordinarily, in constructing the lining of the patent referred to. However, there is a definite plane, in a lining constructed and anchored in the manner disclosed in the Pieters patent, which under certain conditions, such as where the lining is of great area and is subjected to unusually high temperatures, results in the inner portion of the lining separating from the outer portion thereof, with consequent serious injury to or destruction of the lining. That is objectionable for obvious reasons.

My invention is directed to the provision of anchor means for securing a monolithic lining, originally constructed in plastic condition, to a retaining wall in such manner as to prevent the creation in the lining of a zone or plane of cleavage between the outer portion of the lining and the inner portion thereof. More specifically, I provide a lining anchor member having, at its inner end, means effective for securing the lining while permitting slippage of the outer portion of the lining to substantially the same extent as the inner portion thereof, during erection of the lining in its plastic condition, whereby relative movement between the outer and the inner portions of the lining is eliminated and the creation of a zone or plane of cleavage within the lining is prevented. Further objects and advantages will appear from the detail description.

In the drawing:

Figure 1 is a plan view of anchor means comprising a lining anchor member embodying my invention; and Figure 2 is a fragmentary vertical sectional view through a retaining wall and a lining therefor attached to the wall by anchor means embodying my invention.

The anchor assembly shown in Figure 1 comprises an outer tie member 3 of inverted U shape, and an inner lining anchor member 4 provided, at its outer end, with a vertically slotted head 5 adapted for reception of one arm of member 3. The latter member is secured in retaining wall 6 in a suitable manner, conveniently by being disposed about a brick of this wall which, in the construction shown, is built up of bricks with intervening bonding material or mortar. The length of tie member 3 is such that its inner arm projects inward a short distance beyond the inner face of wall 6, it being noted that slot 7, extending through head 5 of lining anchor member 4, is of such dimensions as to provide considerable clearance about the inner arm 3a of member 3, thus permitting of movement of member 4 relative to retaining wall 6 in all directions in a plane parallel to the inner face of this wall.

The lining anchor member 4 comprises a shank 7a extending inward from head 5, this shank preferably being of T cross-section, though it may be of any other suitable formation. At its inner end shank 7a is provided with two opposed arms which diverge inwardly from the shank. Each of these arms comprises an outer element 8 and an inner element 9, element 8 being curved on an arc inwardly of shank 7a transversely thereof, and element 9 being curved on an arc outwardly of the shank transversely thereof, the outer end of element 9 merging into the inner end of element 8 and the outer end of the latter element merging into the inner end of shank 7a. The two arms 10, comprising the elements 8 and 9, are thus of smooth contour in plan and define between them a space 11 of substantially elliptical shape, opening between the inner ends of arms 10 through a restriction 12.

In using the anchor means herein shown, the lining anchor members 4 are applied to the wall tie members 3, appropriately spaced, and the lining 13 is erected in plastic condition, from pieces or lumps of plastic material which are pounded together, the lining being built inward from the inner face of retaining wall 6. The material of the lining, in plastic condition, is built around the anchor members 4 and fills the space between the arms 10 thereof. When the portion of the lining which extends inward beyond the anchors is erected, which portion may be termed the inner portion for purposes of description, the outer portion of the lining may slip with the inner portion thereof, incident to the pounding together of the pieces or lumps of plastic material to provide the monolithic lining 13, since the space 11 between the opposed arms 10 of the respective anchors 4 is open at its inner end, at 12. Accordingly, there is no slippage between the inner portion and the outer portion of the lining during erection thereof, such as to create a zone or plane of cleavage between such portions of the lining. Accordingly, the lining remains intimately bonded together throughout its entire cross section, and the inner portion thereof does not fall away or separate from the outer portion of the lining, when this lining is of considerable area and is subjected to exceptionally high temperatures. In that manner, I avoid the difficulties, previously referred to, sometimes encountered, under unusual conditions, when using the lining anchor members of the type referred to, provided at their inner ends with flanges or equivalent elements tending to prevent slippage of the outer portion of the lining while pounding into place the inner portion of the lining, when erecting the lining in plastic condition.

I claim:

1. An anchor member for anchoring to a furnace retaining wall a lining therefor originally formed of plastic material pounded into place, said anchor member comprising a shank provided at one end with two opposed arms each comprising in plan a first arcuate element and a second arcuate element, said first element being curved on an arc inwardly of said shank transversely thereof merging at one end into said shank tangent thereto and projecting outward beyond said shank at one side thereof, said second element being curved on an arc outwardly of said shank merging at one end into the other end of said first element and projecting from the latter inwardly of said shank transversely thereof, said arms defining between them a substantially elliptical space with the distance between the ends of said arms remote from said shank less than the major axis of said space.

2. An anchor member for anchoring to a furnace retaining wall a lining therefor originally formed of plastic material pounded into place, said anchor member comprising a shank provided at one end with two opposed arms each comprising in plan a first arcuate element and a second arcuate element, said first element being curved on an arc inwardly of said shank transversely thereof merging at one end into said shank tangent thereto and projecting outward beyond said shank at one side thereof, said second element being curved on an arc outwardly of said shank merging at one end into the other end of said first element, each of said arms being of smooth and gradual curvature throughout its length.

CHARLES W. DUNLAP.